2 Sheets.
Sheet 1.

Jas. Arkell, B. Smith and A. Smith.
Improvement in Paper Bags.

No. 4,749.

Reissued Feb. 13, 1872.

Witnesses
E. Wolff.
Isidore Felbel

Inventors:
Jas. Arkell, B. Smith
and A. Smith.
By attorney
J. MacEntire

2 Sheets.
Sheet 2.

Jas. Arkell, B. Smith and A. Smith.
Improvement in Paper Bags.

No. 4,749. Reissued Feb. 13, 1872.

Witnesses:
E. Wolff.
Isidore Felbel

Inventors:
Jas. Arkell, B. Smith
and A. Smith
By atty J. Mac Entire

UNITED STATES PATENT OFFICE.

JAMES ARKELL, BENJAMIN SMITH, AND ADAM SMITH, OF CANAJOHARIE, NEW YORK.

IMPROVEMENT IN MAKING PAPER BAGS.

Specification forming part of Letters Patent No. 47,376, dated April 25, 1865; reissue No. 4,749, dated February 13, 1872.

SPECIFICATION.

*To all whom it may concern:*

Be it known that we, JAMES ARKELL, BENJAMIN SMITH, and ADAM SMITH, of Canajoharie, in the county of Montgomery and State of New York, have invented certain new and useful Improvements in the Manufacture of Paper Bags; and we do hereby declare the following to be a full, clear, and exact description thereof, reference being had to the accompanying drawing and to the letters of reference marked thereon.

Figure 1:
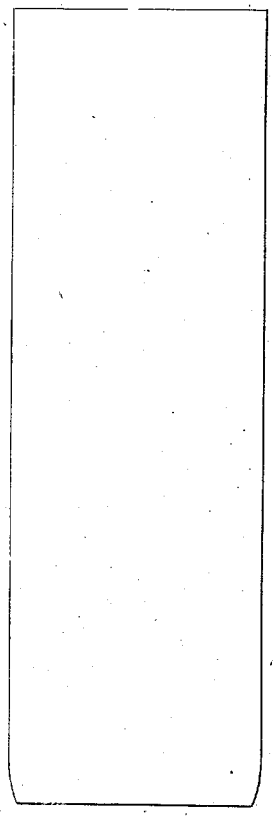
Figure 2:
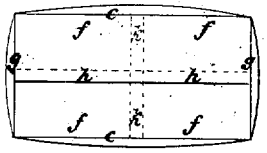
Figure 6:
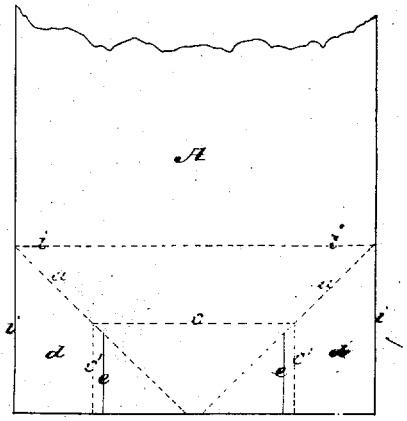
Figure 7:
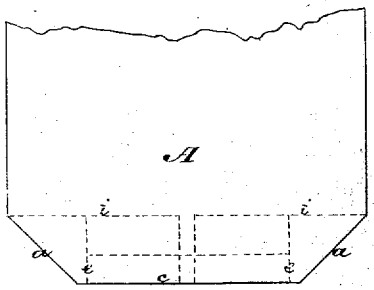
Figure 8:
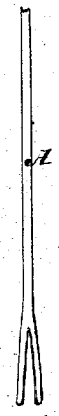
Figure 6:
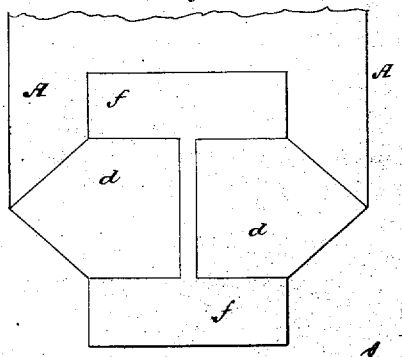

In the accompanying drawing, Figure 1 is a side view of a bag made according to our invention and illustrated as filled or distended. Fig. 2 is a bottom view of the same. Figs. 3, 4, 5, 6, and 6* are a series of views or diagrams illustrating the different steps of the process or method by which the bottom is formed. Fig. 7 is a side view of the lower portion of a furnished bag, folded for packing or transportation, empty; and Fig. 8 is an edge view of the same.

In the several figures the same part or portion will be found designated by the same letter of reference.

Our invention relates to the manufacture of that kind of bags which is so made or formed as to present a "square bottom" or a bottom rectangular in contour, in contradistinction to that kind of bag which is formed by merely pasting or closing up one end of a flattened tube of paper or other material; and consists in a new mode or method of making this kind of bags by folding and pasting the material to form the bottom while the prepared tube or body lies on a table, and without the use of any block or "former," as will be herein more fully explained.

It has been customary, previous to our invention, to fold and form the bottom of this kind of bag over a "former;" but this mode or process of manufacture is necessarily slow, and, consequently, expensive in comparison with a system by which the material of the body can be so folded, on a table, that when distended or opened out it shall present the requisite form or shape.

Figure 3:
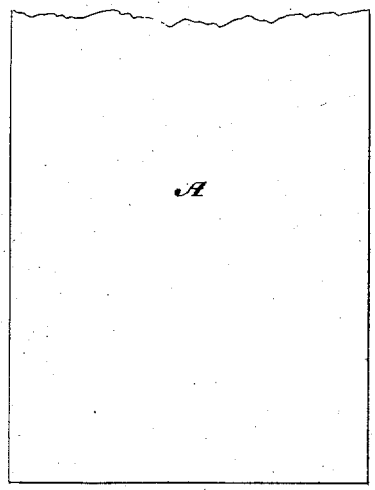
Figure 4:
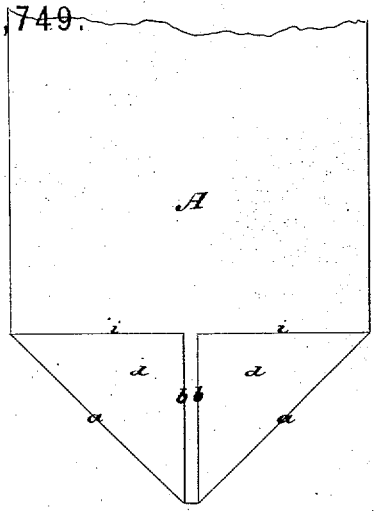
Figure 5:
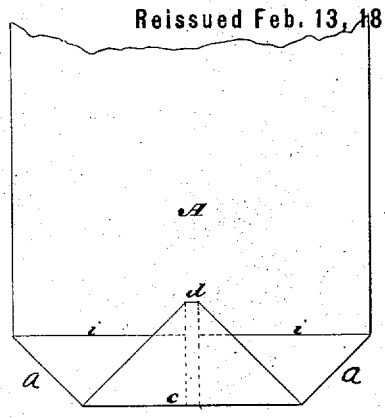

To make a "square-bottom" bag according to our new method or process of manufacture we take the paper or other material, previously folded and pasted into a tubular shape, or like the body of a sack or bag, as represented—for instance at Fig. 3, where enough of one of such tubes or bag-bodies is shown to illustrate the method of forming the bottom of a bag—and laying it on a table we fold over the corners of the flattened tube or body A in about the manner seen at Fig. 4, and so that the flaps or folded-over portions *d* shall nearly or quite meet at the edges *b b*. When these flaps *d d* are unfolded again, creases or fold-marks will be left at the lines *a a;* but before unfolding them we make another fold in the material by doubling it over, as seen at Fig. 5, and so that the material shall receive additional creases, at the line *c* and otherwise, as will be presently explained. This last fold may now be taken out and the material folded over at about the edges *i i* so as to make a crease or fold-mark at this point. The flaps *d d* are now unfolded and the body presents the fold-marks or crease indicated by the dotted lines at Fig. 6. Two cuts, *e e*, may now be made either in or near the crease *c'*; and the portions *d d* are now tucked or folded in so that the body will look as seen at Fig. 6*; after which the portions *f* may be folded over and pasted, when the bottom will be completed and the bag will present when distended the appearance seen at Figs. 1 and 2, and when folded or flattened out for packing or transportation the appearance seen at Figs. 7 and 8.

It will be understood that when the corners or portions *d d* are folded over to quite meet at the edges *b b* (in lieu of nearly meeting, as seen at Fig. 4,) there will be no place left, as at *k*, Fig. 2, but the entire bottom will be four thicknesses of material; and it will be understood that it is not essential in carrying out our invention to make the cuts *e e;* though we have so practiced our invention because the bottom then presents four rectangular flaps, as seen at Fig. 2; is readily pasted; and is neat in appearance.

It will be seen that by our process of forming the bottom of the bag by folding, creasing, and then refolding by the fold-marks as guides the material may be folded into shape for pasting and the bag be completed with greater rapidity and less handling than is possible where the bottom is folded over a former; and it will also be seen that by our method, the bottoms must necessarily be made with great regularity so long as the first folds are made with any tolerable degree of similarity or precision.

Having shown and described our new method of making square-bottom bags, by which we are enabled to dispense with the use of formers and do all the folding on a table or plane surface, what we claim as our invention, and desire to secure by Letters Patent, is—

The within-described method of forming the rectangular bottoms of bags or sacks.

In testimony whereof we have hereunto set our hands and seals this 29th day of May, 1871.

JAS. ARKELL. [L. S.]
BENJAMIN SMITH. [L. S.]
ADAM SMITH. [L. S.]

Witnesses:
H. X. DEVENDORF,
P. D. VAN O'LINDA.